(12) United States Patent
Zhu (10) Patent No.: US 12,147,082 B2
(45) Date of Patent: Nov. 19, 2024

(54) FIBER-OPTIC ADAPTER ASSEMBLY AND FIBER-OPTIC CONNECTION DEVICE

(71) Applicant: HYC Co., Ltd, Guangdong (CN)

(72) Inventor: Lei Zhu, Guangdong (CN)

(73) Assignee: HYC CO., LTD., Guangdong (CN)

( * ) Notice: Subject to any disclaimer, the term of this patent is extended or adjusted under 35 U.S.C. 154(b) by 44 days.

(21) Appl. No.: 17/454,776

(22) Filed: Nov. 12, 2021

(65) Prior Publication Data

US 2022/0163736 A1 May 26, 2022

(30) Foreign Application Priority Data

Nov. 25, 2020 (CN) .......................... 202011341821.3

(51) Int. Cl.
*G02B 6/00* (2006.01)
*G02B 6/38* (2006.01)

(52) U.S. Cl.
CPC ......... *G02B 6/3897* (2013.01); *G02B 6/3825* (2013.01); *G02B 6/3831* (2013.01); *G02B 6/389* (2013.01)

(58) Field of Classification Search
CPC .. G02B 6/3897; G02B 6/3825; G02B 6/3831; G02B 6/389; G02B 6/00
See application file for complete search history.

(56) References Cited

U.S. PATENT DOCUMENTS

| 7,384,200 | B2 * | 6/2008 | Nakagawa | ........... | G02B 6/3897 |
| | | | | | 248/27.3 |
| 9,599,779 | B2 * | 3/2017 | Lee | ........ | G02B 6/3897 |
| 2014/0334780 | A1 * | 11/2014 | Nguyen | ............... | G02B 6/3897 |
| | | | | | 385/77 |
| 2016/0124160 | A1 * | 5/2016 | Verheyden | ........... | G02B 6/3881 |
| | | | | | 385/56 |
| 2016/0313512 | A1 * | 10/2016 | Liu | ........ | G02B 6/3825 |

FOREIGN PATENT DOCUMENTS

| CN | 102346281 A | 2/2012 |
| CN | 202281844 U | 6/2012 |
| CN | 211786230 U | 10/2020 |
| CN | 112327429 A | 2/2021 |

(Continued)

OTHER PUBLICATIONS

International Search Report, mailed on Nov. 22, 2021, from PCT/CN2021/120715, International Filing Date Sep. 26, 2022. 4 pages.

(Continued)

*Primary Examiner* — Jennifer Doan
(74) *Attorney, Agent, or Firm* — ArentFox Schiff LLP (57) ABSTRACT

Provided are a fiber-optic adapter assembly and a fiber-optic connection device. The fiber-optic adapter assembly includes a plurality of unitary adapters that are stacked and an elastic clipping body. The elastic clipping body includes a U-shaped elastic clip. The U-shaped recess of the elastic clip clips no less than two unitary adapters that are stacked. The elastic clipping body includes a first elastic clipping body. The outer surface of the elastic clip of the first elastic clipping body is exposed out of the unitary adapters and provided with a mounting portion. The mounting portion is detachably connected to a fiber-optic box.

20 Claims, 8 Drawing Sheets

(56) References Cited

FOREIGN PATENT DOCUMENTS

| | | |
|---|---|---|
| CN | 213517661 U | 6/2021 |
| JP | H1184176 A | 3/1999 |
| JP | H11271569 A | 10/1999 |
| JP | 2004045622 A | 2/2004 |
| JP | 2012226267 A | 11/2012 |
| WO | 2007052359 A1 | 5/2007 |

OTHER PUBLICATIONS

Office Action dated May 6, 2024 from corresponding Chinese Application No. 202011341821.3.

* cited by examiner

FIBER-OPTIC ADAPTER ASSEMBLY AND FIBER-OPTIC CONNECTION DEVICE

CROSS-REFERENCES TO RELATED APPLICATIONS

This application claims priority to Chinese Patent Application No. 202011341821.3, filed on Nov. 25, 2020, the disclosure of which is expressly incorporated by reference herein in its entirety.

TECHNICAL FIELD

The present disclosure relates to the technical field of fiber-optic communication and, in particular, to a fiber-optic adapter assembly and a fiber-optic connection device.

BACKGROUND

A fiber-optic adapter is an element that detachably and movably connects optical fibers. The fiber-optic adapter functions to butt two end faces of the optical fibers precisely to ensure that optical signals output by an optical fiber are coupled into a reception optical fiber to the maximum extent.

With the explosive growth of the information Internet, the requirement for the density of fiber-optic connection increases continuously, strengthening the demand for compact mounting of a plurality of unitary adapters. In the related art, flanges are disposed on the two sides of an unitary adapter or at the upper and lower ends of the unitary adapter, and are used for engaging with the mounting hole of a fiber-optic box in a snap-fit manner. When a plurality of unitary adapters are combined, the arrangement of the flanges results in a gap between two adjacent unitary adapters so that the adapters fail to be compactly arranged and assembled.

SUMMARY

The present disclosure provides a fiber-optic adapter assembly and a fiber-optic connection device so as to achieve the compact arrangement of a plurality of unitary adapters and reduce the mounting area of a fiber-optic box.

The present disclosure adopts the technical solutions below.

The present disclosure provides a fiber-optic adapter assembly. The fiber-optic adapter assembly includes a plurality of unitary adapters that are stacked and an elastic clipping body.

An elastic clipping body includes a U-shaped elastic clip. The U-shaped recess of the elastic clip clips no less than two unitary adapters that are stacked. The elastic clipping body includes a first elastic clipping body. An outer surface of an elastic clip of the first elastic clipping body is exposed out of the unitary adapters and provided with a mounting portion. The mounting portion is detachably connected to a mounting panel.

The present disclosure provides a fiber-optic connection device. The fiber-optic connection device includes a mounting panel, and the fiber-optic adapter assembly. The mounting panel is provided with a mounting hole. The fiber-optic adapter assembly is mounted in the mounting hole.

REFERENCE LIST 100 fiber-optic box
101 mounting hole
1 unitary adapter
2 elastic clipping body
11 first snap-fit recess
21 side plate
22 connection plate
111 positioning protrusion
211 snap-fit piece
212 abutting piece
213 hook
221 positioning recess

DETAILED DESCRIPTION

Embodiments in accordance with the present disclosure are described in detail hereinafter. Examples of the embodiments are illustrated in the drawings, where the same or similar reference numerals indicate the same or similar elements or elements having the same or similar functions.

The embodiments described hereinafter with reference to the drawings are merely exemplary; they are intended to explain the present disclosure.

In the description of the present disclosure, it should be noted that the orientations or position relations indicated by terms such as "center", "above", "below", "left", "right", "vertical", "horizontal", "inside", and "outside" are based on orientations or position relations shown in the drawings. These orientations or position relations are intended only to facilitate and simplify description of the present disclosure, and not to indicate or imply that a device or element referred to must have such specific orientations or must be configured or operated in such specific orientations. Additionally, terms such as "first" and "second" are used merely for the purpose of description and are not to be construed as indicating or implying relative importance. The terms "first position" and "second position" are two different positions.

Unless otherwise expressly specified and limited, the term "mounting", "connection", "connected" or "fixed" is to be construed in a broad sense, for example, as fixedly connected, detachably connected, mechanically connected or electrically connected, directly connected to each other or indirectly connected to each other via an intermediary, or internally connected or interactional relationships between two components. For those of ordinary skill in the art, meanings of the preceding terms in the present utility model may be understood based on situations.

Unless otherwise expressly specified and limited, when a first feature is described as "above" or "below" a second feature, the first feature and the second feature may be in direct contact or be in contact via another feature between the two features. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

The solutions of the present disclosure are further described hereinafter through specific embodiments in conjunction with the drawings.

Embodiment One

Figure 1:
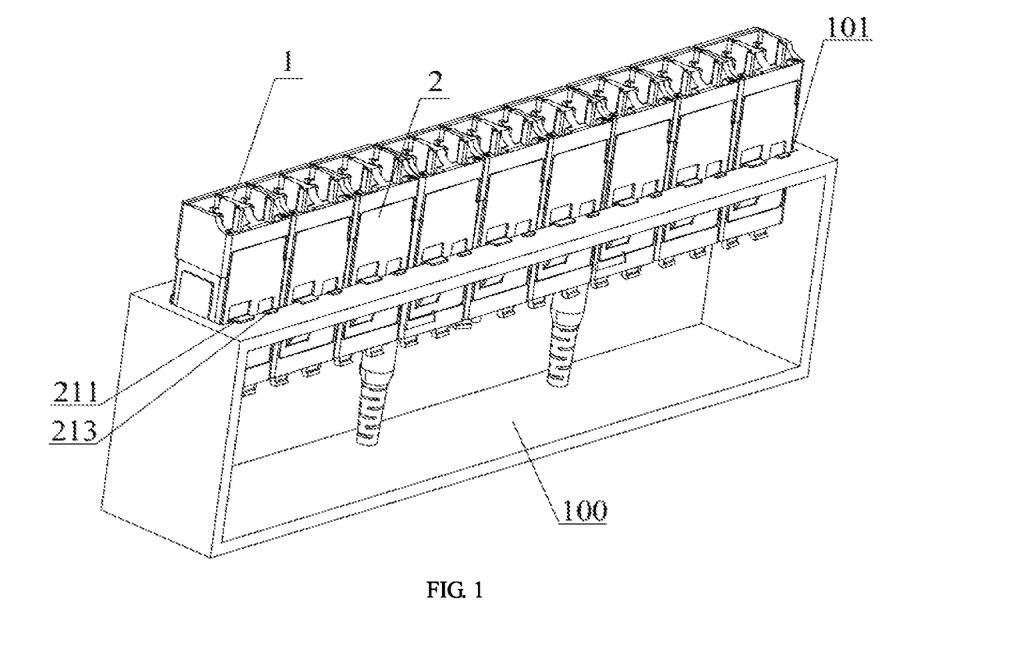
FIG. 1 is a view illustrating the structure of a fiber-optic connection device from a first viewing angle according to embodiment one of the present disclosure.
Figure 2:
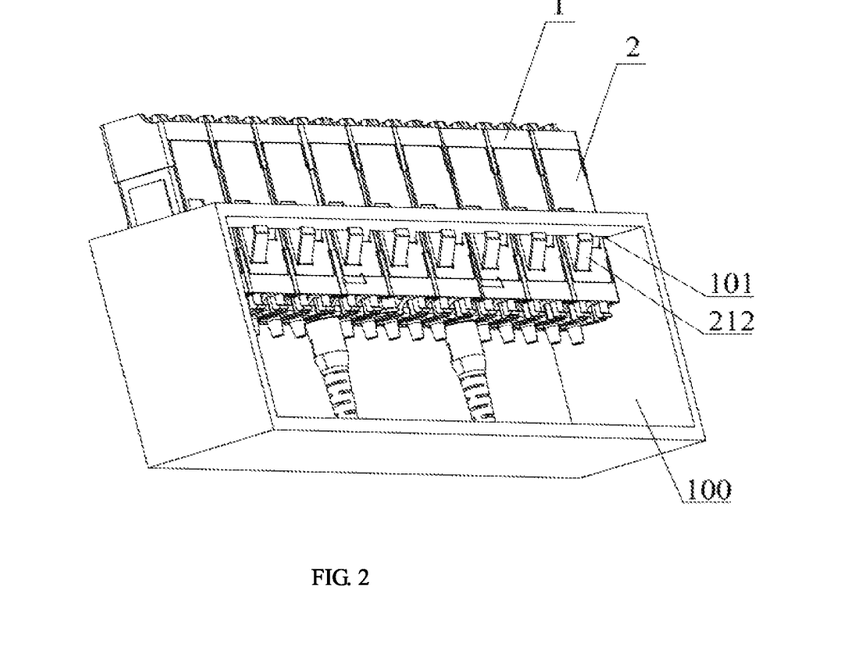
FIG. 2 is a view illustrating the structure of a fiber-optic connection device from a second viewing angle according to embodiment one of the present disclosure.

As shown in FIGS. 1 and 2, this embodiment provides a fiber-optic connection device. The fiber-optic connection device includes a mounting panel and a fiber-optic adapter assembly. The mounting panel is provided with a mounting hole 101. The fiber-optic adapter assembly is mounted in the mounting hole 101. In this embodiment, the mounting panel is a fiber-optic box 100. The rectangular mounting hole 101 is disposed in the fiber-optic box 100. A plurality of unitary adapters 1 are juxtaposed with each other in the rectangular mounting hole 101. An elastic clipping body 2 includes a U-shaped elastic clip and a mounting portion. The U-shaped recess of the U-shaped elastic clip clips a unitary adapter 1. The mounting portion is disposed on the elastic clip. The unitary adapter 1 is mounted in the mounting hole 101 of the fiber-optic box 100 through the mounting portion. In other embodiments, a fiber-optic adapter assembly including at least two unitary adapters 1 that are stacked is mounted in the mounting hole 101 of the fiber-optic box 100 in the same manner.

Figure 3:
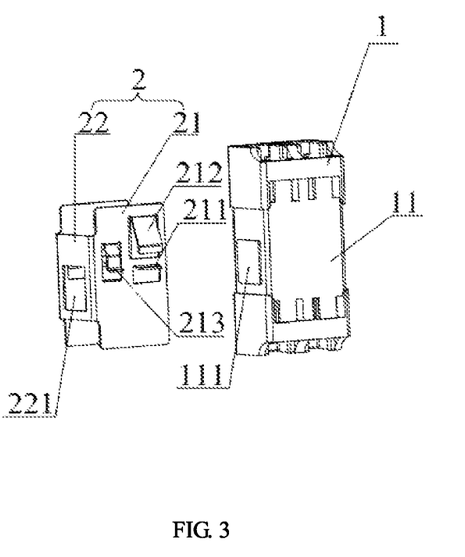
FIG. 3 is an exploded view illustrating a unitary adapter and an elastic clipping body according to embodiment one of the present disclosure.
Figure 4:
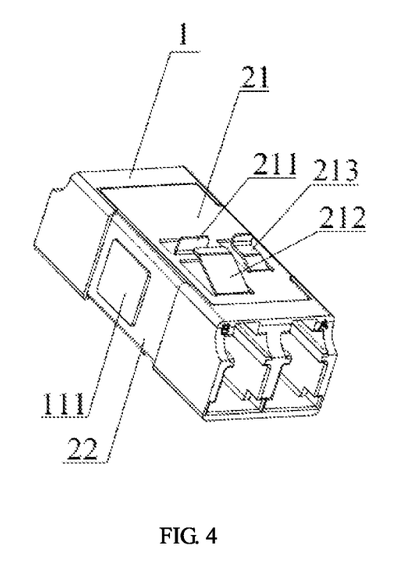
FIG. 4 is an assembly view of a unitary adapter and an elastic clipping body according to embodiment one of the present disclosure.

Optionally, as shown in FIGS. 3 and 4, the unitary adapter 1 is provided with a first snap-fit recess 11. The elastic clip snaps into the first snap-fit recess 11. Optionally, the depth of the first snap-fit recess 11 is greater than or equal to the wall thickness of the elastic clip. In this embodiment, the first snap-fit recess 11 is disposed around the outer wall of the unitary adapter 1. The U-shaped elastic clip surrounds the outer wall of the unitary adapter 1. The depth of the first snap-fit recess 11 is greater than or equal to the wall thickness of the elastic clip, so that two adjacent unitary adapters 1 are prevented from not being compactly arranged in the case where a plurality of unitary adapters 1 are combined. The mounting portion on the elastic clip is configured to engage with the two sides of the mounting hole 101 in a snap-fit manner such that the unitary adapter 1 is mounted in the fiber-optic box 100.

Optionally, one of the first snap-fit recess 11 or the elastic clip is provided with a positioning protrusion 111, and the other of the first snap-fit recess 11 or the elastic clip is provided with a positioning recess 221. The positioning protrusion 111 is inserted into the positioning recess 221 for being positioned. Apparently, in other embodiments, the positioning recess 221 may be disposed in the first snap-fit recess 11, and the positioning protrusion 111 may be disposed on the connection plate 22 of the elastic clipping body 2.

Optionally, the elastic clipping body 2 includes two side plates 21 disposed opposite to each other and spaced apart from each other, and a connection plate 22 connected between the two side plates 21 and perpendicular to each of the two side plates 21. The two side plates 21 of the same elastic clipping body 2 are disposed respectively on the two opposite sides of the unitary adapter 1 in the stacking direction of the unitary adapters 1. The positioning protrusion 111 or the positioning recess 221 is eccentrically disposed on the connection plate 22. In this embodiment, the positioning protrusion 111 is disposed on the sidewall of the unitary adapter 1. The positioning recess 221 is disposed on the connection plate 22 of the elastic clipping body 2. The position protrusion 111 matches with the positioning recess 221 to secure the elastic clipping body 2 to the unitary adapter 1. The positioning recess 221 is eccentrically disposed on the connection plate 22 such that the elastic clipping body 2 is mounted only when the elastic clipping body 2 faces a certain direction, so that the uniqueness of the mounting position of the elastic clipping body 2 in the case where a plurality of unitary adapters 1 are combined. This arrangement avoids the wrong mounting position of one elastic clipping body 2 when the adapter assembly is assembled, where the wrong mounting position results in that the fiber-optic adapter assembly is to be reassembled, and the efficiency of assembling is low.

In this embodiment, the length of the connection plate 22 (that is, the distance between the two side plates 21) of the elastic clipping body 2 mounted on one unitary adapter 1 matches with the heights of one unitary adapter 1. The width of the two side plates 21 matches with the width of one unitary adapter 1. The length of the two side plates 21 is greater than the width of the connection plate 22. Accordingly, the rigidity of the two side plates 21 of the elastic clipping body 2 is strengthened, and the clipping force of the elastic clipping body 2 against the unitary adapter 1 is increased.

Optionally, the mounting portion includes a snap-fit piece 211 and an abutting piece 212. The snap-fit piece 211 is configured to abut against the upper end face of the mounting hole 101 of the mounting panel. The abutting piece 212 is configured to abut against the lower end face of the mounting hole 101. In this embodiment, the two side plates 21 of the elastic clipping body 2 are each provided with a mounting portion. The mounting portions on the two sides of the elastic clipping body 2 match with the two sides of the mounting hole 101 for being mounted. One end of the snap-fit piece 211 extends from a side plate 21 in the direction perpendicular to the side plate 21. One side of the snap-fit piece 211 abuts against the upper end face of the mounting hole 101. One end of the abutting piece 212 extends outward obliquely from the side plate 21. The end of the oblique extension is bent inward. The end face of the bent end abuts against the lower end face of the mounting hole 101. The space between the snap-fit piece 211 and the abutting piece 212 is the same as the depth of the mounting hole 101.

Optionally, the mounting portion further includes a hook 213, where the hook 213 is juxtaposed with the snap-fit piece 211, and hooks the upper end face of the mounting hole 101. In this embodiment, the hook 213 includes an L-shaped hook and an inclined plate. The L-shaped hook hooks the upper end face of the mounting hole 101. The inclined plate extends outward from the side plate 21 and is connected to the non-hook end of the L-shaped hook. The length of the long arm of the L-shaped hook matches with the depth of the mounting hole 101. The long arm of the L-shaped hook abuts against the inner wall of the mounting hole 101 to enable that the unitary adapter 1 snaps into the mounting hole 101 more stably without shaking.

Embodiment Two

Figure 5:
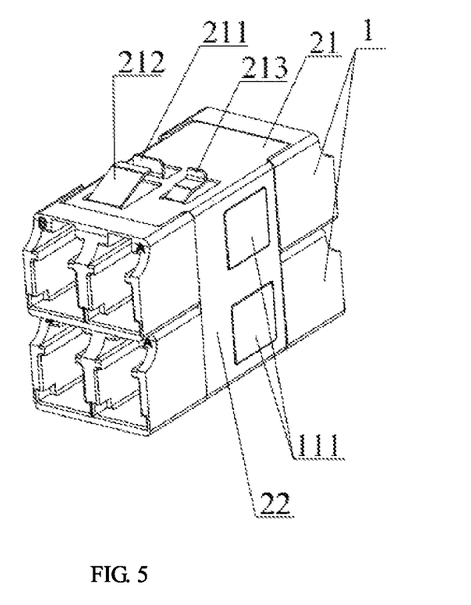
FIG. 5 is a view illustrating the structure of a fiber-optic adapter assembly according to embodiment two of the present disclosure.
Figure 6:
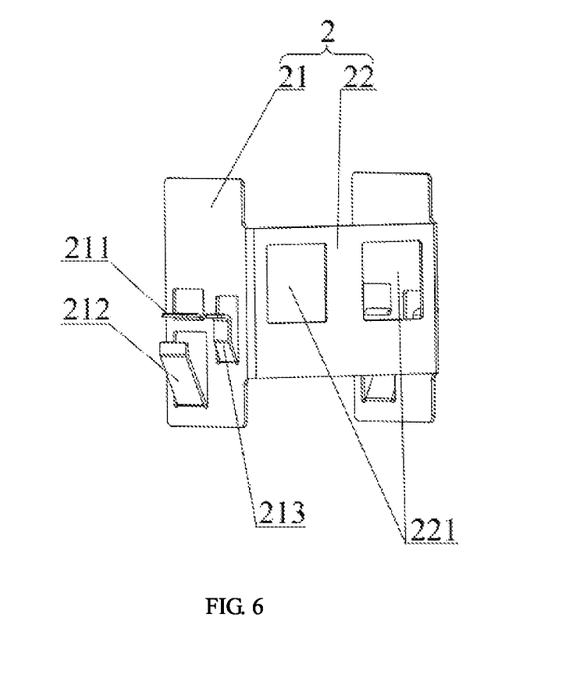
FIG. 6 is a view illustrating the structure of a first-type elastic clipping body according to embodiment two of the present disclosure.

As shown in FIGS. 5 and 6, this embodiment provides a fiber-optic adapter assembly. The fiber-optic adapter assembly includes at least two unitary adapters 1 that are stacked, and at least one elastic clipping body 2. An elastic clipping body 2 includes a U-shaped elastic clip. The U-shaped recess of each elastic clip clips no less than two unitary adapters 1 that are stacked. Moreover, the outer surface of the elastic clip does not protrude from the outer surface of a unitary adapter 1. The elastic clip exposed out of the outer surface of the unitary adapters 1 is provided with a mounting portion. The mounting portion is detachably connected to a mounting panel.

As for the fiber-optic adapter assembly provided by this embodiment, an elastic clipping body 2 includes a U-shaped elastic clip. The U-shaped recess of each elastic clip clips no less than two unitary adapters 1 that are stacked. Moreover, the outer surface of the elastic clip does not protrude out of the outer surface of a unitary adapter 1. The mounting portion on the outer surface exposed out of the unitary adapters 1 is detachably connected to a fiber-optic box 100. As for the fiber-optic adapter assembly provided by this embodiment, the at least one elastic clipping body 2 is reasonably arranged, so that a plurality of unitary adapters 1 are assembled into the fiber-optic adapter assembly, and the requirement for the density of fiber-optic connection is met. The mounting portion is disposed on the elastic clipping body 2, and only the elastic clip exposed out of the outer surface of the unitary adapters 1 is provided with a mounting portion, so that no space exists between two adjacent unitary adapters 1, a plurality of unitary adapters 1 are capable of being arranged compactly, the mounting space of the mounting panel is reduced effectively, and the requirement for compactly mounting the fiber-optic adapters is met.

As shown in FIGS. 5 and 6, in this embodiment, the fiber-optic adapter assembly includes two unitary adapters 1 that are stacked and are clipped together by one elastic clipping body 2. The elastic clipping body 2 is a first-type elastic clipping body 2 in the fiber-optic adapter assembly. The length of the connection plate 22 of a first-type elastic clipping body 2 matches with the sum of the heights of two unitary adapters 1. The connection plate 22 is provided with two positioning recesses 221 engaging with positioning protrusions 111 on the two unitary adapters 1 in a snap-fit manner respectively. Two side plates are each provided with a mounting portion. The mounting portions engage with the two sides of the mounting hole 101 of the fiber-optic box 100 in a snap-fit manner respectively. The first-type elastic clipping body 2 is able to clip two unitary adapters 1 to form one fiber-optic adapter assembly.

In another optional embodiment of the present disclosure, the fiber-optic adapter assembly may include two unitary adapters 1 that are juxtaposed with each other and are stacked. The elastic clip of one elastic clipping body 2 may clip the two unitary adapters 1 that are juxtaposed with each other and are stacked. The width of each of the two side plates 21 of the elastic clipping body 2 matches with the sum of the widths of the two unitary adapters 1. The length of a connection plate 22 matches with the height of one unitary adapter 1.

Embodiment Three

The difference between this embodiment and embodiment two lies in that the fiber-optic adapter assembly in this embodiment includes three unitary adapters 1 and two elastic clipping bodies 2.

Figure 7:
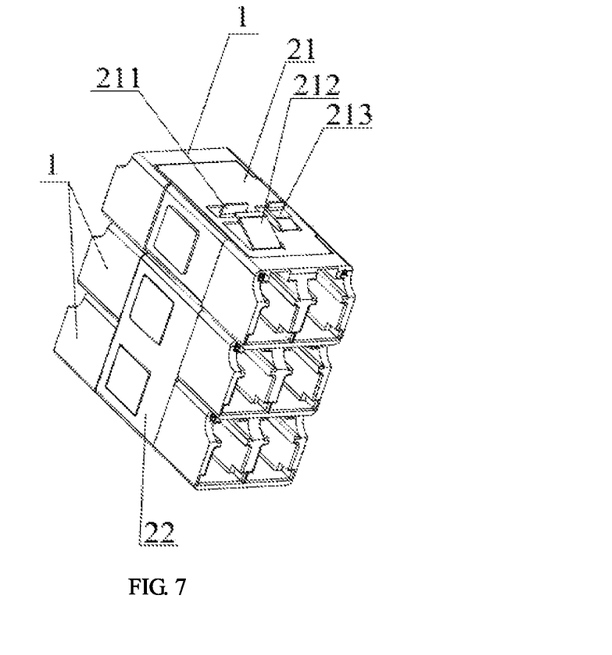
FIG. 7 is a view illustrating the structure of a fiber-optic adapter assembly from a first viewing angle according to embodiment three of the present disclosure.
Figure 8:
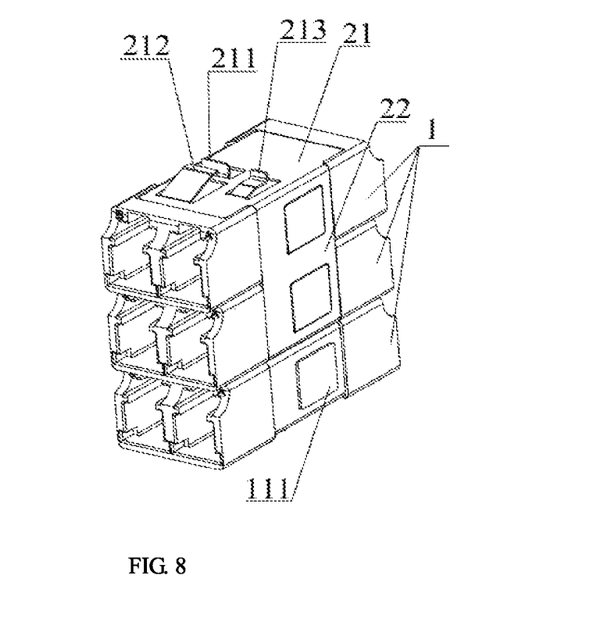
FIG. 8 is a view illustrating the structure of a fiber-optic adapter assembly from a second viewing angle according to embodiment three of the present disclosure.

Optionally, as shown in FIGS. 7 and 8, the fiber-optic adapter assembly includes at least three unitary adapters 1 that are stacked. Each elastic clipping body 2 clips two unitary adapters 1. Moreover, any two adjacent unitary adapters 1 are clipped by at least one elastic clipping body 2. In this embodiment, each elastic clipping body 2 clips two unitary adapters 1. The arrangement of the length of two side plates 21 enables that the two side plates 2 of the elastic clipping body 2 have enough clipping force to clip the two unitary adapters 1 for securing.

In another optional embodiment in this disclosure, one elastic clipping body 2 may clip three unitary adapters 1. Through designing and calculating the rigidity of the side plates 21 of the elastic clipping body 2, the lengths of the side plates 21 are adjusted such that the three unitary adapters 1 are clipped under the clipping force.

Optionally, among at least two elastic clipping bodies 2 for clipping the at least three unitary adapters 1 that are stacked, two elastic clipping bodies 2 are staggered in the stacking direction of the unitary adapters 1. The bottoms of the U-shaped recesses of the two elastic clipping bodies 2 are disposed on the two opposite sides of the unitary adapters 1. Moreover, the unitary adapter 1 in the middle of three adjacent unitary adapters 1 is clipped by the two elastic clipping bodies 2. In this embodiment, the fiber-optic adapter assembly includes two elastic clipping bodies 2. The two elastic clipping bodies 2 are each a second-type elastic clipping body 2. The three unitary adapters are stacked together. From top to bottom, the first unitary adapter 1 and the second unitary adapter 1 are clipped by a second-type elastic clipping body 2. The other second-type elastic clipping body 2 is flipped 180° to clip the second unitary adapter 2 and the third unitary adapter 2. The bottoms of the U-shaped recesses of the elastic clips of the two second-type elastic clipping bodies 2 are disposed on the two sides of the fiber-optic adapter assembly. With this arrangement, the rigidity of the two side plates of an elastic clipping body 2 enables two unitary adapters 1 to be clipped. Moreover, the two elastic clipping bodies 2 are disposed opposite to each other, so that the stability of clipping is enhanced, and a unitary adapter 1 is prevented from coming out from one side. It is to be noted that, the two sides of a unitary adapter 1 are each provided with a positioning protrusion 111. The height of each positioning protrusion 111 is lower than or equal to the depth of a first snap-fit recess 11.

Figure 9:
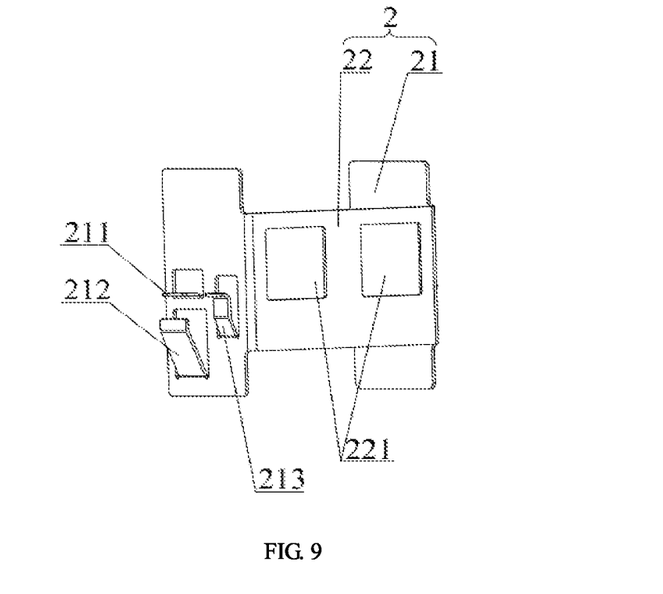
FIG. 9 is a view illustrating the structure of a second-type elastic clipping body according to embodiment three of the present disclosure.

As shown in FIG. 9, one side plate 21 of a second-type elastic clipping body 2 is provided with a mounting portion, and the other side plate 21 between two unitary adapters 1 is not provided with a mounting portion.

Embodiment Four

The difference between this embodiment and embodiment three lies in that the fiber-optic adapter assembly in this embodiment includes four unitary adapters 1 and three elastic clipping bodies 2.

Figure 10:
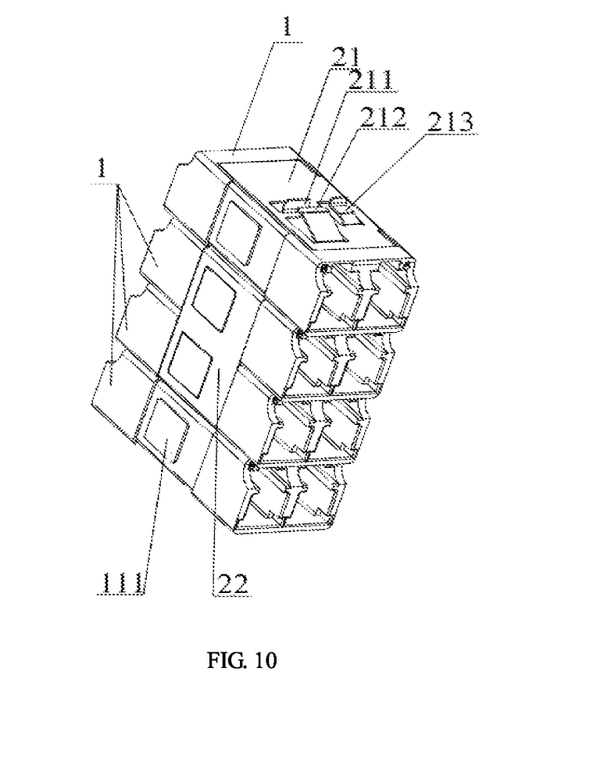
FIG. 10 is a view illustrating the structure of a fiber-optic adapter assembly from a first viewing angle according to embodiment four of the present disclosure.
Figure 11:
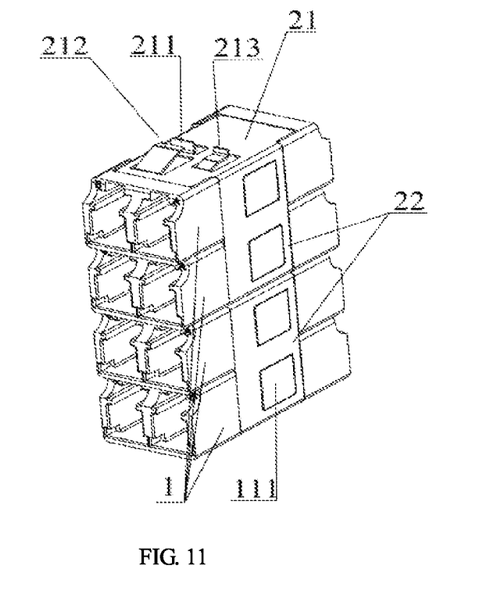
FIG. 11 is a view illustrating the structure of a fiber-optic adapter assembly from a second viewing angle according to embodiment four of the present disclosure.

As shown in FIGS. 10 and 11, the four unitary adapters 1 are stacked. From top to bottom, the first unitary adapter 1 and the second unitary adapter 1 are clipped by a second-type elastic clipping body 2. The third unitary adapter 1 and the fourth unitary adapter 1 are clipped by a third-type elastic clipping body 2. The second unitary adapter 1 and the third unitary adapter 1 are clipped by a fourth-type elastic clipping body 2. The bottom of the U-shaped recess of the elastic clip of the second-type elastic clipping body 2 and the bottom of the U-shaped recess of the elastic clip of the third-type elastic clipping body 2 are disposed on the same side of the fiber-optic adapter assembly. The bottom of the U-shaped recess of the elastic clip of the fourth-type elastic clipping body 2 is disposed on the other side of the fiber-optic adapter assembly.

Figure 12:
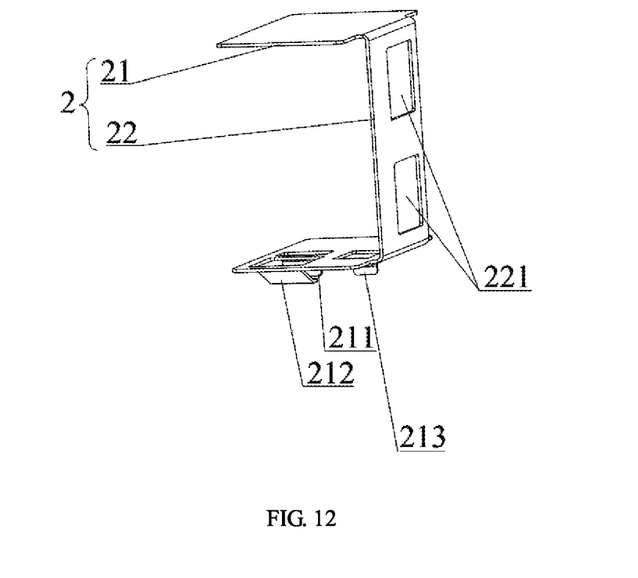
FIG. 12 is a view illustrating the structure of a third-type elastic clipping body according to embodiment four of the present disclosure.

As shown in FIGS. 9 and 12, the second-type elastic clipping body 2 and the third-type elastic clipping body 2 differ in the following aspect: From the direction facing two side plates 21, a mounting portion of one of the second-type elastic clipping body 2 or the third-type elastic clipping body 2 is disposed on the left side of the bottom of the U-shaped recess of the elastic clip, and a mounting portion of the other of the second-type elastic clipping body 2 or the third-type elastic clipping body 2 is disposed on the right side of the bottom of the U-shaped recess of the elastic clip.

Figure 13:
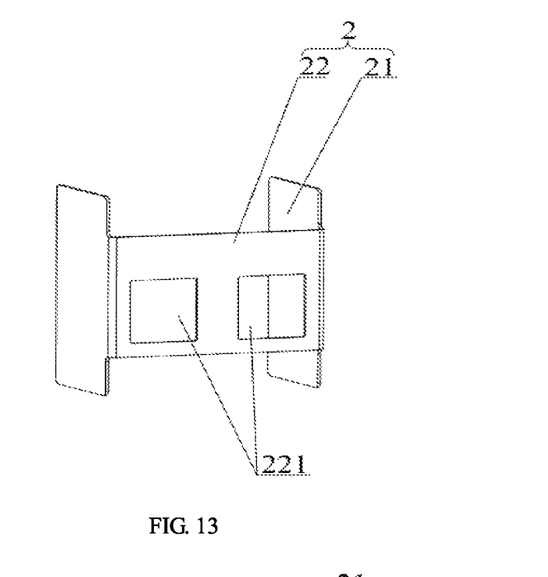
FIG. 13 is a view illustrating the structure of a fourth-type elastic clipping body according to embodiment four of the present disclosure.

As shown in FIG. 13, each of the two side plates 21 of the fourth-type elastic clipping body 2 is not provided with a mounting portion. In assembling the fiber-optic adapter assembly, the two side plates 21 of the fourth-type elastic clipping body 2 are each disposed between two adjacent unitary adapters 1.

Embodiment Five

The difference between this embodiment and embodiment four lies in that the fiber-optic adapter assembly in this embodiment includes five unitary adapters 1 and four elastic clipping bodies 2.

Figure 14:
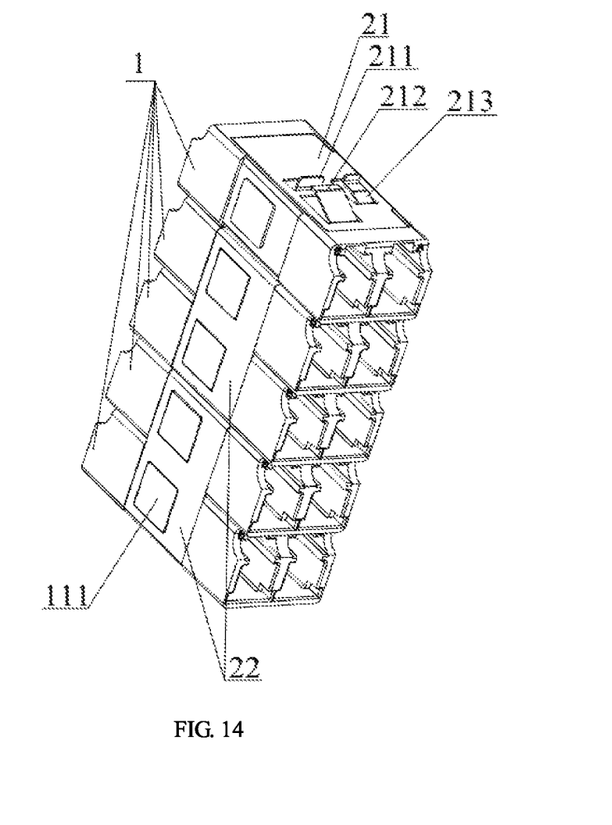
FIG. 14 is a view illustrating the structure of a fiber-optic adapter assembly from a first viewing angle according to embodiment five of the present disclosure.
Figure 15:
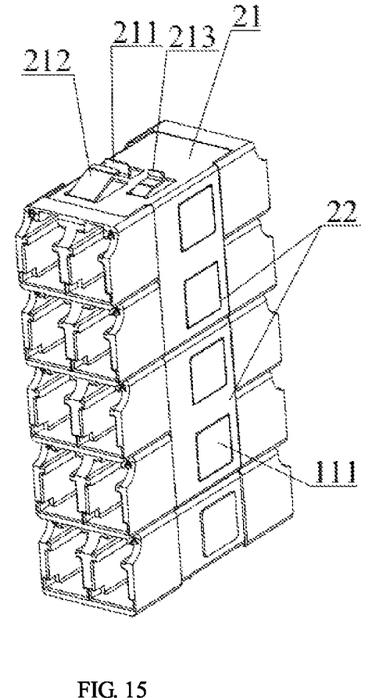
FIG. 15 is a view illustrating the structure of a fiber-optic adapter assembly from a second viewing angle according to embodiment five of the present disclosure.

As shown in FIGS. 14 and 15, the five unitary adapters 1 are stacked in the up-down direction. From top to bottom, the first unitary adapter 1 and the second unitary adapter 1 are clipped by a second-type elastic clipping body 2. The third unitary adapter 1 and the fourth unitary adapter 1 are clipped by a fourth-type elastic clipping body 2. The fourth unitary adapter 1 and the fifth unitary adapter 1 are clipped by a second-type elastic clipping body 2. The second unitary adapter 1 and the third unitary adapter 1 are clipped by a fourth-type elastic clipping body 2. The bottom of the U-shaped recess of the elastic clip of one second-type elastic clipping body 2 and the bottom of the U-shaped recess of the elastic clip of one fourth-type elastic clipping body 2 are disposed on one side of the fiber-optic adapter assembly. The bottom of the U-shaped recess of the elastic clip of the other second-type elastic clipping body 2 and the bottom of the U-shaped recess of the elastic clip of the other fourth-type elastic clipping body 2 are disposed on the other side of the fiber-optic adapter assembly.

In the present disclosure, a first-type elastic clipping body 2, a second-type elastic clipping body 2, a third-type elastic clipping body 2, and a fourth-type elastic clipping body 2 are formed by molding plastics and may be produced using the same set of molds. Then a mounting portion is processed on a side plate 21. In this case, the production cost is saved.

An elastic clipping body 2 provided by the present disclosure is U-shaped. In other embodiments, the elastic clipping body 2 may be E-shaped or I-shaped.

The assembling scheme of the fiber-optic adapter assembly provided by the present disclosure is not only suitable for the compact arrangement and stacked mounting of LC adapters but also suitable for the compact arrangement and stacked mounting of other types of adapters, including SC adapters and MPO adapters.

As for the fiber-optic adapter assembly provided by the present disclosure, an elastic clipping body includes a U-shaped elastic clip. The U-shaped recess of each elastic clip clips no less than two unitary adapters that are stacked. Moreover, the outer surface of the elastic clip does not protrude out of the outer surface of a unitary adapter. The mounting portion on the exposed outer surface of the unitary adapters is detachably connected to a fiber-optic box. As for the fiber-optic adapter assembly provided by the present disclosure, the at least one elastic clipping body is reasonably arranged, so that a plurality of unitary adapters are assembled into the fiber-optic adapter assembly, and the requirement for the density of fiber-optic connection is met. The mounting portion is disposed on the elastic clipping body, and only the elastic clip exposed out of the outer surface of the unitary adapters is provided with a mounting portion, so that no space exists between two adjacent unitary adapters, a plurality of unitary adapters are capable of being arranged compactly, the mounting space of the mounting panel is reduced effectively, and the requirement for compactly mounting the fiber-optic adapters is met.

What is claimed is:

1. A fiber-optic adapter assembly, comprising a plurality of unitary adapters that are stacked and an elastic clipping body, wherein the elastic clipping body comprises a U-shaped elastic clip; a U-shaped recess of the elastic clip clips no less than two unitary adapters that are stacked among the plurality of unitary adapters; the elastic clipping body comprises a first elastic clipping body, an outer surface of an elastic clip of the first elastic clipping body is exposed out of the plurality of adapters and provided with a mounting portion; and the mounting portion is detachably connected to a mounting panel.

2. The fiber-optic adapter assembly according to claim 1, wherein the fiber-optic adapter assembly comprises at least two elastic clipping bodies, the fiber-optic adapter assembly comprises at least three unitary adapters that are stacked, each of the at least two elastic clipping bodies clips two unitary adapters of the at least three unitary adapters, and any two adjacent unitary adapters of the at least three unitary adapters are clipped by at least one elastic clipping body of the at least two elastic clipping bodies.

3. The fiber-optic adapter assembly according to claim 1, wherein the fiber-optic adapter assembly comprises three unitary adapters that are stacked, and two elastic clipping bodies for clipping the three unitary adapters that are stacked, and the two elastic clipping bodies are staggered in a stacking direction of the three unitary adapters; bottoms of U-shaped recesses of the two elastic clipping bodies are disposed on two opposite sides of the three unitary adapters; and one unitary adapter in a middle of the three adjacent unitary adapters is clipped by the two elastic clipping bodies.

4. The fiber-optic adapter assembly according to claim 1, wherein each of the plurality of unitary adapters is provided with a first snap-fit recess, and the elastic clip snaps into the first snap-fit recess.

5. The fiber-optic adapter assembly according to claim 4, wherein a depth of the first snap-fit recess is greater than or equal to a wall thickness of the elastic clip.

6. The fiber-optic adapter assembly according to claim 4, wherein the first snap-fit recess is provided with a positioning protrusion, the elastic clip is provided with a positioning recess, and the positioning protrusion is inserted into the positioning recess for being positioned.

7. The fiber-optic adapter assembly according to claim 6, wherein the elastic clipping body comprises two side plates disposed opposite to each other and spaced apart from each other, and a connection plate connected between the two side plates and perpendicular to each of the two side plates, the two side plates of the elastic clipping body are disposed respectively on two opposite sides of the plurality of unitary adapters in the stacking direction of the plurality of unitary adapters, and the positioning recess is eccentrically disposed on the connection plate.

8. The fiber-optic adapter assembly according to claim 4, wherein the first snap-fit recess is provided with a positioning recess, the elastic clip is provided with a positioning protrusion, and the positioning protrusion is inserted into the positioning recess for being positioned.

9. The fiber-optic adapter assembly according to claim 8, wherein the elastic clipping body comprises two side plates disposed opposite to each other and spaced apart from each other, and a connection plate connected between the two side plates and perpendicular to each of the two side plates, the two side plates of the elastic clipping body are disposed respectively on two opposite sides of the plurality of unitary adapters in the stacking direction of the plurality of unitary adapters, and the positioning protrusion is eccentrically disposed on the connection plate.

10. The fiber-optic adapter assembly according to claim 1, wherein the mounting portion comprises a snap-fit piece and an abutting piece, the snap-fit piece is configured to abut against an upper end face of a mounting hole of the mounting panel, and the abutting piece is configured to abut against a lower end face of the mounting hole.

11. The fiber-optic adapter assembly according to claim 10, wherein the mounting portion further comprises a hook, wherein the hook is juxtaposed with the snap-fit piece, and hooks the upper end face of the mounting hole.

12. The fiber-optic adapter assembly according to claim 1, comprising a plurality of elastic clipping bodies, the plurality of elastic clipping bodies comprises the first elastic clipping body and a second elastic clipping body;
wherein an elastic clip of the second elastic clipping body is provided with no mounting portion.

13. A fiber-optic connection device, comprising a mounting panel, and the fiber-optic adapter assembly according to claim 1, wherein the mounting panel is provided with a mounting hole, and the fiber-optic adapter assembly is mounted in the mounting hole.

14. The fiber-optic connection device according to claim 13, wherein the fiber-optic adapter assembly comprises at least two elastic clipping bodies, the fiber-optic adapter assembly comprises at least three unitary adapters that are stacked, each of the at least two elastic clipping bodies clips two unitary adapters of the at least three unitary adapters, and any two adjacent unitary adapters of the at least three unitary adapters are clipped by at least one elastic clipping body of the at least two elastic clipping bodies.

15. The fiber-optic connection device according to claim 13, wherein the fiber-optic adapter assembly comprises three unitary adapters that are stacked, and two elastic clipping bodies for clipping the three unitary adapters that are stacked, and the two elastic clipping bodies are staggered in a stacking direction of the three unitary adapters; bottoms of U-shaped recesses of the two elastic clipping bodies are disposed on two opposite sides of the three unitary adapters; and one unitary adapter in a middle of the three adjacent unitary adapters is clipped by the two elastic clipping bodies.

16. The fiber-optic connection device according to claim 13, wherein each of the plurality of unitary adapters is provided with a first snap-fit recess, and the elastic clip snaps into the first snap-fit recess.

17. The fiber-optic connection device according to claim 16, wherein a depth of the first snap-fit recess is greater than or equal to a wall thickness of the elastic clip.

18. The fiber-optic connection device according to claim 16, wherein the first snap-fit recess is provided with a positioning protrusion, the elastic clip is provided with a positioning recess, and the positioning protrusion is inserted into the positioning recess for being positioned.

19. The fiber-optic connection device according to claim 18, wherein the elastic clipping body comprises two side plates disposed opposite to each other and spaced apart from each other, and a connection plate connected between the two side plates and perpendicular to each of the two side plates, the two side plates of the elastic clipping body are disposed respectively on two opposite sides of the plurality of unitary adapters in the stacking direction of the plurality of unitary adapters, and the positioning recess is eccentrically disposed on the connection plate.

20. The fiber-optic connection device according to claim 16, wherein the first snap-fit recess is provided with a positioning recess, the elastic clip is provided with a positioning protrusion, and the positioning protrusion is inserted into the positioning recess for being positioned.

* * * * *